US012646009B2

(12) United States Patent
Kan et al.

(10) Patent No.: US 12,646,009 B2
(45) Date of Patent: Jun. 2, 2026

(54) SYSTEM, METHOD, AND COMPUTER PROGRAM PRODUCT FOR FEATURE SIMILARITY-BASED MONITORING AND VALIDATION OF MODELS

(71) Applicant: Visa International Service Association, San Francisco, CA (US)

(72) Inventors: Xi Kan, Austin, TX (US); Sheng Wang, Austin, TX (US); Shuo Wang, Cedar Park, TX (US); Pei Yang, Austin, TX (US); Dan Wang, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 825 days.

(21) Appl. No.: 17/872,068

(22) Filed: Jul. 25, 2022

(65) Prior Publication Data

US 2024/0028975 A1 Jan. 25, 2024

(51) Int. Cl.
| | |
|---|---|
| *G06N 20/20* | (2019.01) |
| *G06F 18/21* | (2023.01) |
| *G06F 18/22* | (2023.01) |
| *G06Q 20/40* | (2012.01) |

(52) U.S. Cl.
CPC ......... *G06N 20/20* (2019.01); *G06F 18/2163* (2023.01); *G06F 18/22* (2023.01); *G06Q 20/40* (2013.01)

(58) Field of Classification Search
CPC .... G06N 20/20; G06N 5/045; G06F 18/2163; G06F 18/22; G06Q 20/40; G06Q 20/4016; G06Q 20/389; G06K 9/62
See application file for complete search history.

(56) References Cited

U.S. PATENT DOCUMENTS

| | | | |
|---|---|---|---|
| 8,635,117 B1 | 1/2014 | Acuna-Rohter | |
| 9,685,024 B2 | 6/2017 | Kemper et al. | |
| 10,462,172 B1 | 10/2019 | Sadaghiani et al. | |
| 10,599,984 B1 | 3/2020 | Wubbels et al. | |
| 12,165,017 B1 * | 12/2024 | Grossman | G06F 17/17 |
| 2013/0218758 A1 | 8/2013 | Koenigsbrueck et al. | |
| 2014/0379561 A1 | 12/2014 | Amancherla et al. | |
| 2016/0224980 A1 | 8/2016 | Stinchcombe | |
| 2017/0124570 A1 | 5/2017 | Nidamanuri et al. | |
| 2017/0330109 A1 * | 11/2017 | Maughan | G06N 5/04 |
| 2018/0060738 A1 | 3/2018 | Achin et al. | |

(Continued)

OTHER PUBLICATIONS

Agarwal et al., "AI-Powered Decision Making for the Bank of the Future", McKinsey & Company, Global Banking & Securities, Mar. 2021, pp. 1-12.

(Continued)

*Primary Examiner* — Aleksandr Kerzhner
(74) *Attorney, Agent, or Firm* — The Webb Law Firm

(57) ABSTRACT

Systems, methods, and computer program products calculate a historical feature similarity point distribution associated with a first machine learning model, calculate a real-time feature similarity point distribution associated with a second machine learning model, and automatically provide, based on a comparison of the historical feature similarity point distribution to the real-time feature similarity point distribution, an indication of whether the second machine learning model is aligned with the first machine learning model.

18 Claims, 5 Drawing Sheets

(56) References Cited

U.S. PATENT DOCUMENTS

| | | | |
|---|---|---|---|
| 2020/0111037 A1 | 4/2020 | Mondal | |
| 2020/0380455 A1 | 12/2020 | Joy et al. | |
| 2020/0394659 A1 | 12/2020 | Qu et al. | |
| 2021/0133632 A1* | 5/2021 | Elprin | G06F 11/3409 |
| 2021/0264432 A1 | 8/2021 | Devdas et al. | |
| 2021/0279633 A1 | 9/2021 | Derany et al. | |
| 2024/0095547 A1* | 3/2024 | Gupta | G06N 5/022 |
| 2024/0112066 A1* | 4/2024 | Ba | G06N 20/00 |
| 2024/0303148 A1* | 9/2024 | Gosala | G06F 11/079 |

OTHER PUBLICATIONS

Guidotti et al., "A Survey of Methods for Explaining Black Box Models", ACM Computing Surveys, Aug. 2018, pp. 1-42, vol. 51, No. 5, art. 93.

Lucas, "Credit Card Fraud Detection Using Machine Learning with Integration of Contextual Knowledge", INSA de Lyon, Universitat Passau, Sep. 2020, pp. 1-125.

* cited by examiner

SYSTEM, METHOD, AND COMPUTER PROGRAM PRODUCT FOR FEATURE SIMILARITY-BASED MONITORING AND VALIDATION OF MODELS

CROSS REFERENCE TO RELATED APPLICATIONS

This application is related to U.S. Provisional Patent Application No. 63/306,550, filed on Feb. 4, 2022, the disclosure of which is incorporated by reference herein in its entirety.

BACKGROUND

1. Field

This disclosure relates to monitoring and validation of machine learning models and, in some non-limiting embodiments or aspects, to feature-similarity based monitoring and score validation for machine learning/deep learning model deployment.

2. Technical Considerations

Many machine learning models do not reach production. There is a significant gap between building a machine learning model and making the model production-ready due to machine learning deployment challenges. Model monitoring and model validation are elements in machine learning/deep learning product deployment cycle used to ensure consistency between an offline or prototype model and an online or deployed model. However, the unique and complex nature of model behavior and model lifecycle present challenges in model monitoring and model validation.

Performance metrics (e.g., precision, recall, etc.) may be used for model monitoring. However, as illustrated by FIG. 5, performance metrics may not be ready in real-time due to delayed labels. In addition, as also illustrated by FIG. 5, existing offline/real-time model validation typically reruns the offline data pipeline and model scoring steps and makes a comparison with real-time outcomes from the deployed model, which is time and resource consuming.

SUMMARY

Accordingly, provided are improved systems, devices, products, apparatus, and/or methods for monitoring and validation of machine learning models.

According to some non-limiting embodiments or aspects, provided is a method, including: obtaining, with at least one processor, a plurality of training samples and a plurality of first machine learning model outputs generated by a first machine learning model based on the plurality of training samples; segmenting, with the at least one processor, based on the plurality of first machine learning model outputs, the plurality of training samples into a plurality of training sample groups; sampling, with the at least one processor, a number of the training samples from each training sample group of the plurality of training sample groups; for each training sample group, determining, with the at least one processor, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtaining, with the at least one processor, an inference sample and a second machine learning model output generated by a second machine learning model based on the inference sample; classifying, with the at least one processor, based on the second machine learning model output, the inference sample into a training sample group of the plurality of training sample groups; for each sampled training sample of the training sample group into which the inference sample is classified, determining, with the at least one processor, the feature similarity point for that sampled training sample and the inference sample, wherein a real-time feature similarity point distribution includes the feature similarity point for each sampled training sample and the inference sample; and automatically providing, with the at least one processor, based on a comparison of the historical feature similarity point distribution to the real-time feature similarity point distribution, an indication of whether the second machine learning model is aligned with the first machine learning model.

In some non-limiting embodiments or aspects, the plurality of first machine learning model outputs includes a plurality of raw scores in a predetermined range, and wherein the plurality of training sample groups includes a plurality of evenly spaced intervals in the predetermined range.

In some non-limiting embodiments or aspects, for each training sample group, the feature similarity point for each pair of sampled training samples in that training sample group is determined according to the following Equation:

$$fsp_{ab} = e^{-\left(\sum_{i=0}^{t1} \frac{\|n_{ia}-n_{ib}\|^2}{2\sigma^2} + \sum_{i=0}^{t2} \delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

In some non-limiting embodiments or aspects, the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

In some non-limiting embodiments or aspects, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

In some non-limiting embodiments or aspects, the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

In some non-limiting embodiments or aspects, the real-time payment transaction includes a first plurality of transaction parameters, wherein the second machine learning model output includes a first authorization decision, and wherein automatically providing the indication further includes: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

According to some non-limiting embodiments or aspects, provided is a system, including: at least one processor programmed and/or configured to: obtain a plurality of training samples and a plurality of first machine learning model outputs generated by a first machine learning model based on the plurality of training samples; segment, based on the plurality of first machine learning model outputs, the plurality of training samples into a plurality of training sample groups; sample, a number of the training samples from each training sample group of the plurality of training sample groups; for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtain, an inference sample and a second machine learning model output generated by a second machine learning model based on the inference sample; classify, based on the second machine learning model output, the inference sample into a training sample group of the plurality of training sample groups; for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model.

In some non-limiting embodiments or aspects, the plurality of first machine learning model outputs includes a plurality of raw scores in a predetermined range, and wherein the plurality of training sample groups includes a plurality of evenly spaced intervals in the predetermined range.

In some non-limiting embodiments or aspects, for each training sample group, the feature similarity point for each pair of sampled training samples in that training sample group is determined according to the following Equation:

$$fsp_{ab} = e^{-\left(\sum_{i=0}^{t1} \frac{\|n_{ia}-n_{ib}\|^2}{2\sigma^2} + \sum_{i=0}^{t2} \delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, $t1+t2=T$, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

In some non-limiting embodiments or aspects, in the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

In some non-limiting embodiments or aspects, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

In some non-limiting embodiments or aspects, the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

In some non-limiting embodiments or aspects, wherein the real-time payment transaction includes a first plurality of transaction parameters, wherein the second machine learning model output includes a first authorization decision, and wherein automatically providing the indication further includes: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

According to some non-limiting embodiments or aspects, provided is a computer program product comprising at least one non-transitory computer-readable medium including program instructions that, when executed by at least one processor, cause the at least one processor to: obtain a plurality of training samples and a plurality of first machine learning model outputs generated by a first machine learning model based on the plurality of training samples; segment, based on the plurality of first machine learning model outputs, the plurality of training samples into a plurality of training sample groups; sample, a number of the training samples from each training sample group of the plurality of training sample groups; for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtain, an inference sample and a second machine learning model output generated by a second machine learning model based on the inference sample; classify, based on the second machine learning model output, the inference sample into a training sample group of the plurality of training sample groups; for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model.

In some non-limiting embodiments or aspects, the plurality of first machine learning model outputs includes a plurality of raw scores in a predetermined range, and wherein the plurality of training sample groups includes a plurality of evenly spaced intervals in the predetermined range.

In some non-limiting embodiments or aspects, for each training sample group, the feature similarity point for each pair of sampled training samples in that training sample group is determined according to the following Equation:

$$fsp_{ab} = e^{-\left(\sum_{i=0}^{t1} \frac{\|n_{ia}-n_{ib}\|^2}{2\sigma^2} + \sum_{i=0}^{t2} \delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

In some non-limiting embodiments or aspects, the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

In some non-limiting embodiments or aspects, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

In some non-limiting embodiments or aspects, the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

In some non-limiting embodiments or aspects, the real-time payment transaction includes a first plurality of transaction parameters, wherein the second machine learning model output includes a first authorization decision, and wherein automatically providing the indication further includes: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

Further non-limiting embodiments or aspects are set forth in the following numbered clauses:

Clause 1. A method, comprising: obtaining, with at least one processor, a plurality of training samples and a plurality of first machine learning model outputs generated by a first machine learning model based on the plurality of training samples; segmenting, with the at least one processor, based on the plurality of first machine learning model outputs, the plurality of training samples into a plurality of training sample groups; sampling, with the at least one processor, a number of the training samples from each training sample group of the plurality of training sample groups; for each training sample group, determining, with the at least one processor, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtaining, with the at least one processor, an inference sample and a second machine learning model output generated by a second machine learning model based on the inference sample; classifying, with the at least one processor, based on the second machine learning model output, the inference sample into a training sample group of the plurality of training sample groups; for each sampled training sample of the training sample group into which the inference sample is classified, determining, with the at least one processor, the feature similarity point for that sampled training sample and the inference sample, wherein a real-time feature similarity point distribution includes the feature similarity point for each sampled training sample and the inference sample; and automatically providing, with the at least one processor, based on a comparison of the historical feature similarity point distribution to the real-time feature similarity point distribution, an indication of whether the second machine learning model is aligned with the first machine learning model.

Clause 2. The method of clause 1, wherein the plurality of first machine learning model outputs includes a plurality of raw scores in a predetermined range, and wherein the plurality of training sample groups includes a plurality of evenly spaced intervals in the predetermined range.

Clause 3. The method of clauses 1 or 2, wherein, for each training sample group, the feature similarity point for each pair of sampled training samples in that training sample group is determined according to the following Equation:

$$fsp_{ab} = e^{-\left(\Sigma_{i=0}^{t1} \frac{\|n_{ia}-n_{ib}\|^2}{2\sigma^2} + \Sigma_{i=0}^{t2}\delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

Clause 4. The method of any of clauses 1-3, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

Clause 5. The method of any of clauses 1-4, wherein, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

Clause 6. The method of any of clauses 1-5, wherein the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

Clause 7. The method of any of clauses 1-6, wherein the real-time payment transaction includes a first plurality of transaction parameters, wherein the second machine learning model output includes a first authorization decision, and wherein automatically providing the indication further includes: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

Clause 8. A system, comprising: at least one processor programmed and/or configured to: obtain a plurality of training samples and a plurality of first machine learning model outputs generated by a first machine learning model based on the plurality of training samples; segment, based on the plurality of first machine learning model outputs, the plurality of training samples into a plurality of training sample groups; sample, a number of the training samples from each training sample group of the plurality of training sample groups; for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtain, an inference sample and a second machine learning model output generated by a second machine learning model based on the inference sample; classify, based on the second machine learning model output, the inference sample into a training sample group of the plurality of training sample groups; for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model.

Clause 9. The system of clause 8, wherein the plurality of first machine learning model outputs includes a plurality of raw scores in a predetermined range, and wherein the plurality of training sample groups includes a plurality of evenly spaced intervals in the predetermined range.

Clause 10. The system of clauses 8 or 9, wherein, for each training sample group, the feature similarity point for each pair of sampled training samples in that training sample group is determined according to the following Equation:

$$fsp_{ab} = e^{-\left(\sum_{i=0}^{t1} \frac{\|n_{ia} - n_{ib}\|^2}{2\sigma^2} + \sum_{i=0}^{t2} \delta_{iaib}\right)}$$

s.t.

-continued
$$\delta_{iaib} = \begin{cases} 0 & \text{if} & c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

Clause 11. The system of any of clauses 8-10, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

Clause 12. The system of any of clauses 8-11, wherein, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

Clause 13. The system of any of clauses 8-12, wherein the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

Clause 14. The system of any of clauses 8-13, wherein the real-time payment transaction includes a first plurality of transaction parameters, wherein the second machine learning model output includes a first authorization decision, and wherein the at least one processor automatically providing the indication further includes: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

Clause 15. A computer program product comprising at least one non-transitory computer-readable medium including program instructions that, when executed by at least one processor, cause the at least one processor to: obtain a plurality of training samples and a plurality of first machine learning model outputs generated by a first machine learning model based on the plurality of training samples; segment, based on the plurality of first machine learning model outputs, the plurality of training samples into a plurality of training sample groups; sample, a number of the training samples from each training sample group of the plurality of training sample groups; for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtain, an inference sample and a second machine learning model output generated by a second machine learning model based on the inference sample; classify, based on the second machine learning model output, the inference sample into a training sample group of the plurality of training sample groups; for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model.

Clause 16. The computer program product of clause 15, wherein the plurality of first machine learning model outputs includes a plurality of raw scores in a predetermined range, and wherein the plurality of training sample groups includes a plurality of evenly spaced intervals in the predetermined range.

Clause 17. The computer program product of clauses 15 or 16, wherein, for each training sample group, the feature similarity point for each pair of sampled training samples in that training sample group is determined according to the following Equation:

$$fsp_{ab} = e^{-\left(\sum_{i=0}^{t1} \frac{\|n_{ia}-n_{ib}\|^2}{2\sigma^2} + \sum_{i=0}^{t2} \delta_{iaib}\right)}$$

s.t.

$$\delta_{iaib} = \begin{cases} 0 & \text{if } c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, $t1+t2=T$, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

Clause 18. The computer program product of any of clauses 15-17, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

Clause 19. The computer program product of any of clauses 15-18, wherein, in response to the hypothesis test determining that the historical feature similarity point distribution is statistically significantly different than the real-time feature similarity point distribution, automatically providing the indication includes automatically providing the indication including an alert that the second machine learning model is not aligned with the first machine learning model.

Clause 20. The computer program product of any of clauses 15-19, wherein the plurality of training samples is associated with a plurality of historical payment transactions processed in a transaction processing network, wherein the inference sample is associated with a real-time payment transaction currently being processed in the transaction processing network, and wherein each of the first machine learning model and the second machine learning model includes at least one of the following types of machine learning models: a fraud detection model, a Smarter Posting Authorization (SPA) model, or any combination thereof.

Clause 21. The computer program product of any of clauses 15-20, wherein the real-time payment transaction includes a first plurality of transaction parameters, wherein the second machine learning model output includes a first authorization decision, and wherein the instructions further cause the at least one processor to automatically provide the indication by: in response to the indication including an alert that the second machine learning model is not aligned with the first machine learning model: querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold; determining, with the at least one processor, at least one impact parameter of the first plurality of transaction parameters by comparing the first plurality of transaction parameters with the plurality of transaction parameters associated with the plurality of historical payment transactions in the subset; and automatically modifying, with the at least one processor, using a loss function that depends on the at least one impact parameter, the first authorization decision, and the authorization decisions of the subset of historical payment transactions, one or more weights or parameters of the first machine learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
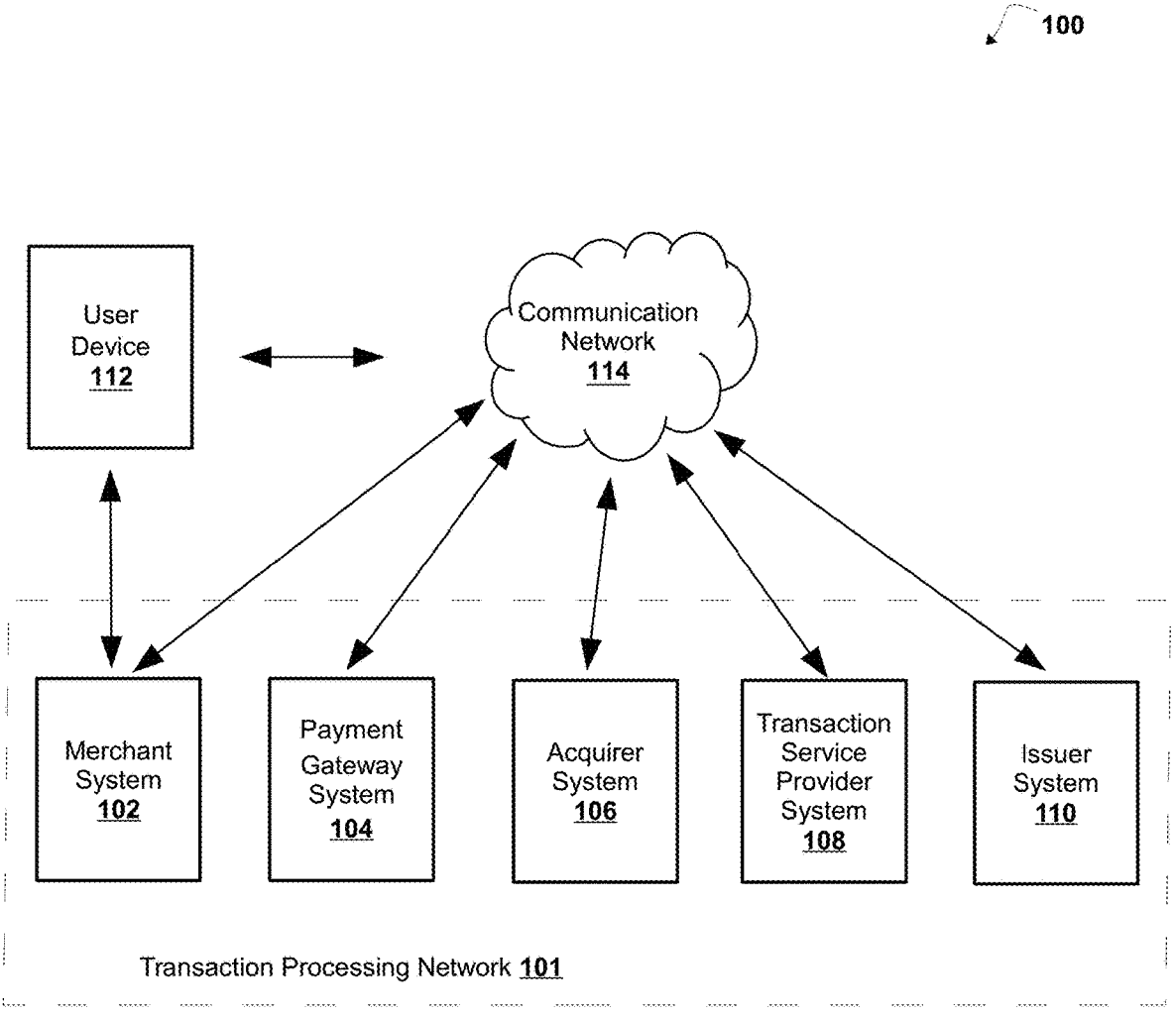
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/ or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for monitoring and validation of machine learning models that obtain a plurality of training samples and a plurality of first machine learning model outputs generated by a first machine learning model based on the plurality of training samples; segment, based on the plurality of first machine learning model outputs, the plurality of training samples into a plurality of training sample groups; sample, a number of the training samples from each training sample group of the plurality of training sample groups; for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group; obtain, an inference sample and a second machine learning model output generated by a second machine learning model based on the inference sample; classify, based on the second machine learning model output, the inference sample into a training sample group of the plurality of training sample groups; for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model.

For example, non-limiting embodiments or aspects of the present disclosure may determine a historical distribution of feature similarity points for each score segment based on training data samples, calculate a real-time distribution of feature similarity points based on each of real-time data samples and training data samples, and, by performing a hypothesis test, monitor and/or validate a production score through identifying a statistical significance in a difference between the historical feature similarity point distribution and real-time feature similarity point distribution. In this way, non-limiting embodiments or aspects of the present disclosure may not require ground truth in production for calculating traditional performance metrics (e.g., precision, accuracy, etc.), may define a novel metric, feature similarity point distribution, which may be obtained based on only real-time and historical feature data, may not require running an offline data pipeline or scoring process, and/or may combine a monitoring and validation process by performing a hypothesis test on feature similarity point historical and real-time distributions instead of manually comparing each feature and score value.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system

108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection.

In some non-limiting embodiments or aspects, user device 112 may include one or more applications associated with user device 112, such as an application stored, installed, and/or executed on user device 112 (e.g., a mobile device application, a native application for a mobile device, a mobile cloud application for a mobile device, an electronic wallet application, a peer-to-peer payment transfer application, a merchant application, an issuer application, etc.).

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
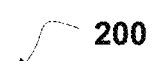
FIG. 2 is a diagram of non-limiting embodiments or aspects of components of one or more devices and/or one or more systems of FIG. 1.
Figure 2:
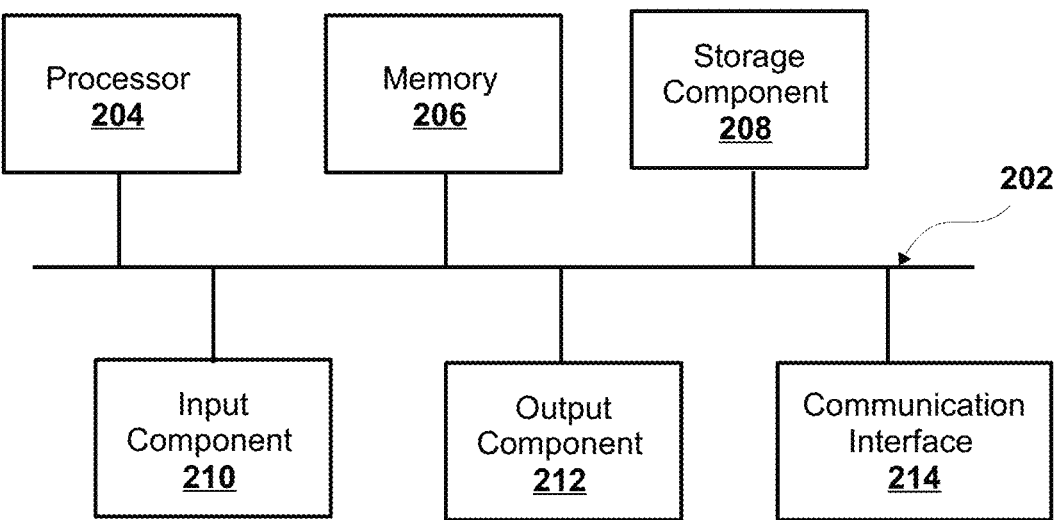

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
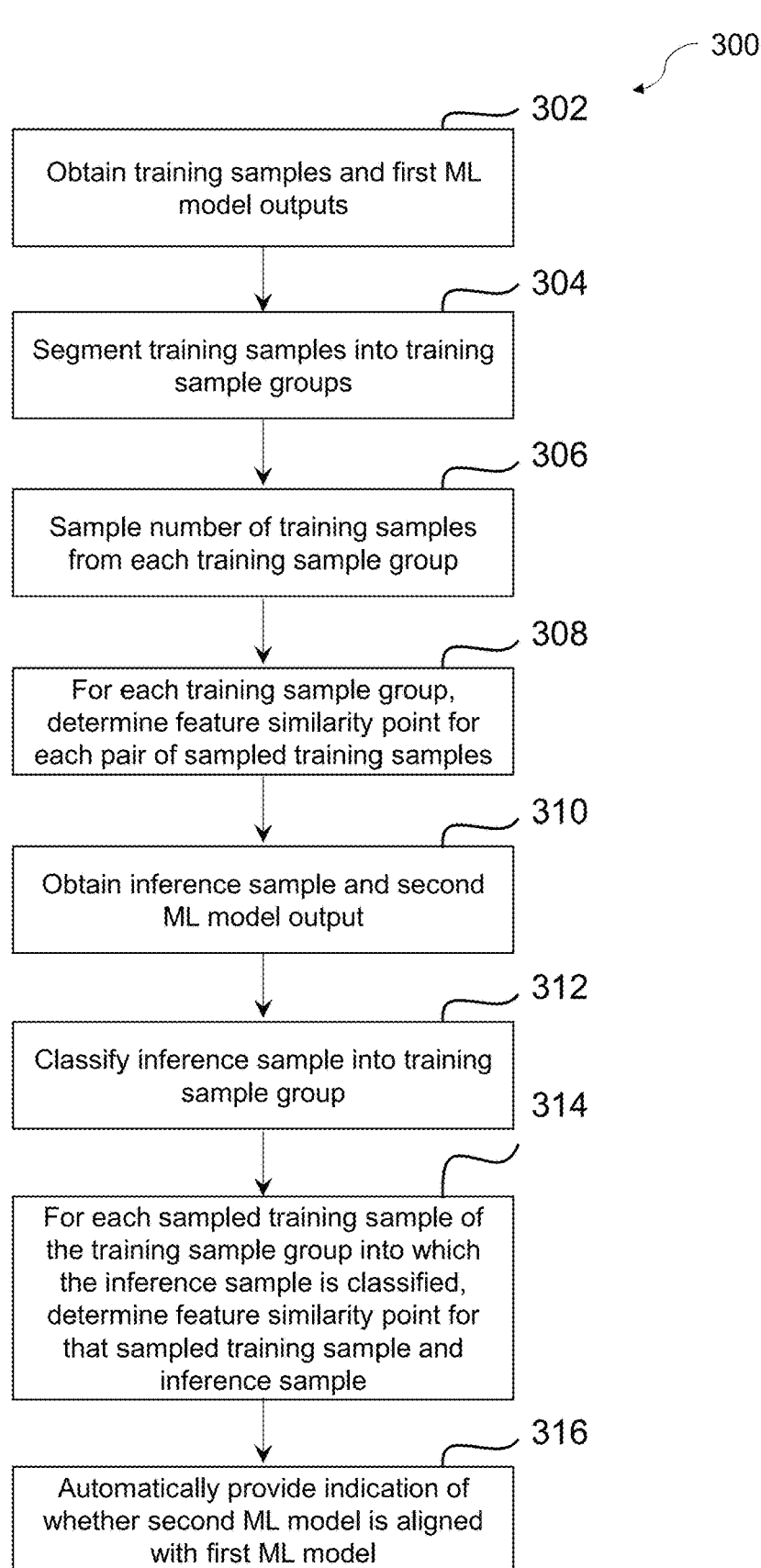
FIG. 3 is a flowchart of non-limiting embodiments or aspects of a process for feature similarity-based monitoring and validation of machine learning models.

Referring now to FIG. 3, FIG. 3 is a flowchart of non-limiting embodiments or aspects of a process 300 for feature similarity-based monitoring and validation of machine learning models. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as, (e.g., one or more devices of merchant system 102), payment gateway system 104 (e.g., one or more devices of payment gateway system 104), acquirer system 106 (e.g., one or more devices of acquirer system 106, issuer system 110 (e.g., one or more devices of issuer system 110), and/or user device 112.

As shown in FIG. 3, at step 302, process 300 includes obtaining training samples and first machine learning model outputs. For example, transaction service provider system 108 may obtain training samples and first machine learning model outputs. As an example, transaction service provider system 108 may obtain a plurality of training samples and a plurality of first machine learning model outputs generated by a first machine learning model based on the plurality of training samples.

A machine learning model (e.g., a machine learning model, a deep learning model, a neural network, a first machine learning model, a second machine learning model, etc.) may be configured to receive, as input, a training sample, and generate, based on the training sample, a machine learning model output. For example, a machine learning model (e.g., a first machine learning model, a second machine learning model, etc.) may include a Smarter Posting Authorization (SPA) model (e.g., a deep neural network, etc.) configured to predict whether a future clearing amount for a transaction will be the same as that of an authorization amount for the transaction (e.g., a true or matching amounts prediction, a false or non-matching amounts prediction, a probability associated with the amounts matching, etc.). As an example, a machine learning model (e.g., a first machine learning model, a second machine learning model, etc.) may include a fraud detection model configured to predict whether a transaction is a fraudulent transaction (e.g., a true or fraud prediction, a false or non-fraud prediction, a probability associated with the transaction being fraudulent, etc.). However, non-limiting embodiments or aspects are not limited thereto, and a machine learning model may be configured to generate any type of prediction for any type of training sample.

In some non-limiting embodiments or aspects, a first machine learning model includes an offline or prototype model, and a second machine learning model includes an online or deployed model. For example, the first machine learning model and the second machine learning model may include different versions or configurations of the same model (e.g., the first machine learning model and the second machine learning model may be configured to generate the same or similar type of predictions, receive the same or similar type of inputs, etc.).

In some non-limiting embodiments or aspects, a training sample is associated with and/or corresponds to a transaction (e.g., a payment transaction in an electronic payment network, etc.) and/or includes transaction data associated with the transaction (e.g., transaction parameters associated with the transaction, etc.). For example, transaction data may include parameters associated with a transaction, such as an account identifier (e.g., a PAN, etc.), a transaction amount, a transaction date and/or time, a type of products and/or services associated with the transaction, a conversion rate of currency, a type of currency, a merchant type, a merchant name, a merchant location, and/or the like. As an example, features (e.g., categorical feature values, numerical feature values, etc.) of a training sample may include transaction parameters of the transaction associated with the training sample and/or features determined based thereon. However, non-limiting embodiments or aspects are not limited thereto, and features of a training sample may include any data including any type of parameters associated with a training sample.

A machine learning model output (e.g., a first machine learning model output, a second machine learning model output, etc.) generated based on a sample (e.g., a training sample, an inference sample, etc.) may include a prediction of whether a future clearing amount for a transaction will be the same as that of an authorization amount for the transaction (e.g., a true or matching amounts prediction, a false or non-matching amounts prediction, a probability associated with the amounts matching, a ranged score, etc.), a prediction of whether a transaction is a fraudulent transaction (e.g., a true or fraud prediction, a false or non-fraud prediction, a probability associated with the transaction being fraudulent, a ranged score, etc.), and/or any other type of prediction for any other type of sample.

As shown in FIG. 3, at step 304, process 300 includes segmenting training samples into training sample groups. For example, transaction service provider system 108 may segment training samples into training sample groups. As an example, transaction service provider system 108 may segment, based on the plurality of first machine learning model outputs, the plurality of training samples into a plurality of training sample groups. In such an example, transaction service provider system 108 may segment the plurality of training samples into the plurality of training sample groups (e.g., into a predetermined number of groups, into evenly spaced intervals, into a number of groups determined based on a distribution of the plurality of first machine learning outputs, etc.), according to probabilities or scores associated with the plurality of first machine learning model outputs. For example, the plurality of first machine learning model outputs may include a plurality of raw scores in a predetermined range, and/or the plurality of training sample groups may include a plurality of evenly spaced intervals in the predetermined range. As an example, given the plurality of first machine learning model outputs having raw scores ranging from 0-1.0, transaction service provider system 108 may group the plurality of training samples (e.g., a training or historical dataset, etc.) by the output probabilities or scores of the model outputs with a class interval=0.1 (e.g., into intervals of 0.1-0.2, 0.2-0.3 . . . 0.9-1.0). In this way, an assumption that a higher degree of feature similarity leads to similar or even equal scores may lead to similar first machine learning model outputs (e.g., similar probabilities, similar scores, etc.) being grouped together.

As shown in FIG. 3, at step 306, process 300 includes sampling a number of training samples from each training sample group. For example, transaction service provider system 108 may sample a number of training samples from each training sample group. As an example, transaction service provider system 108 may sample (e.g., randomly sample, etc.) a number (e.g., a predetermined number, a number determined based on an amount and/or a distribution of the plurality of first machine learning outputs and/or the plurality of training samples, etc.) of the training samples from each training sample group of the plurality of training sample groups. In such an example, assuming an example of 100 k training samples, transaction service provider system 108 may perform random sampling on the grouped training dataset with sample size=1 k in each score group or segment.

As shown in FIG. 3, at step 308, process 300 includes, for each training sample group, determining a feature similarity point for each pair of sampled training samples. For example, transaction service provider system 108 may, for each training sample group, determine a feature similarity point for each pair of sampled training samples. As an example, transaction service provider system 108 may, for each training sample group, determine a feature similarity point for each pair of sampled training samples in that training sample group. In such an example, the feature similarity point for a pair of training samples may be determined based on features of each sampled training sample in the pair of sampled training samples, and/or a historical feature similarity point distribution $D_{his}(i)$ of each training sample group may include the feature similarity point for each pair of sampled training samples in that training sample group. For example, a feature similarity point may be calculated to evaluate a feature similarity of each pair of samples within a segment or group. In such an example, assuming the example of 100 k training samples, transaction service provider system 108 may calculate ~500 k feature similarity points in each segment or group and obtain a historical feature similarity point distribution, $D_{his}$(i)=1, 2, 3, . . . 10), based on the ~500 k feature similarity points calculated in step 308 for each segment. In such an example, $D_{his}(i)$ may be assumed to be normally distributed with mean, $\mu_{his}(i)$.

A feature similarity point may include a metric calculated to measure a similarity of a feature set between two samples (e.g., training samples, etc.). For example, assuming a feature set $\{x_1, x_2, x_3 \ldots x_T\}$, $\{c_1, c_2, c_3 \ldots c_{t1}\}$ may be used to represent all categorical features, and/or $\{n_1, n_2, n_3 \ldots n_{t2}\}$ may be used to represent all numerical features, where t1+t2=T. Given two samples a and b with categorical feature set values $\{c_{1a}, c_{2a}, c_{3a} \ldots c_{t1a}\}$ and $\{c_{1b}, c_{2b}, c_{3b} \ldots c_{t1b}\}$; numerical feature set values in $\{n_{1a}, n_{2a}, n_{3a} \ldots n_{t2a}\}$ and $\{n_{1b}, n_{2b}, n_{3b} \ldots n_{t2b}\}$; a feature similarity point score may be calculated according to the following Equation (1):

$$fsp_{ab} = e^{-\left(\sum_{i=0}^{t1} \frac{\|n_{ia}-n_{ib}\|^2}{2\sigma^2} + \sum_{i=0}^{t2} \delta_{iaib}\right)} \quad (1)$$

s.t.

$$\delta_{iaib} = \begin{cases} 0 & \text{if} \quad c_{ia} = c_{ib} \\ 1 & \text{else} \end{cases}$$

As shown in FIG. 3, at step 310, process 300 includes obtaining an inference sample and a second machine learning model output. For example, transaction service provider system 108 may obtain an inference sample and a second machine learning model output. As an example, transaction service provider system 108 may obtain an inference sample and a second machine learning model output generated by a second machine learning model based on the inference sample.

As previously noted herein, a first machine learning model may include an offline or prototype model, and a second machine learning model may include an online or deployed model. For example, an inference sample may include a real-time input to an online or deployed model, and/or a second machine learning model output may include a prediction generated by the second machine learning model based on the inference sample. As an example, an inference sample may include features associated with a real-time transaction (e.g., a transaction processed and/or currently being processed in transaction processing network 101, etc.) input into a SPA model configured to predict whether a future clearing amount for the transaction will be the same as that of an authorization amount for the transaction. As an example, an inference sample may include features associated with a transaction (e.g., a payment transaction processed and/or currently being processed in transaction processing network 101, etc.) input into a fraud detection model configured to predict whether the transaction is a fraudulent transaction.

As shown in FIG. 3, at step 312, process 300 includes classifying an inference sample into a training sample group. For example, transaction service provider system 108 may classify an inference sample into a training sample group. As an example, transaction service provider system 108 may classify, based on the second machine learning model output, the inference sample into a training sample group of the plurality of training sample groups. In such an example, assuming the example of 100 k training samples, and given an inference sample k, transaction service provider system 108 may classify the inference sample k into one of the ten training sample groups based on a prediction score of the inference sample k generated by the second machine learning model (e.g., into one of the example intervals 0.1-0.2, 0.2-0.3 . . . 0.9-1.0).

As shown in FIG. 3, at step 314, process 300 includes, for each sampled training sample of the training sample group into which an inference sample is classified, determining a feature similarity point for that sampled training sample and the inference sample. For example, transaction service provider system 108 may, for each sampled training sample of the training sample group into which an inference sample is classified, determine a feature similarity point for that sampled training sample and the inference sample. As an example, transaction service provider system 108 may, for each sampled training sample of the training sample group into which the inference sample is classified, determine the feature similarity point for that sampled training sample and the inference sample, wherein a real-time feature similarity point distribution includes the feature similarity point for each sampled training sample and the inference sample. In such an example, assuming that a given inference sample k is classified into an ith training sample segment, transaction service provider system 108 may pair the inference sample k with each historical training sample in the ith score segment (e.g., pair the interference sample k with each 1 k historical sample in the ith score segment assuming the example of 100 k training samples, etc.) and calculate a feature similarity point for each pair (e.g., 1 k feature similarity points calculated assuming the example of 100 k training samples, etc.). For example, transaction service provider system 108 may obtain a real-time feature similarity point distribution $D_{rt}(i_k)$ based on the feature similarity point calculated for each pair of the inference sample k with each historical sample in the ith score segment, which may be assumed to be normally distributed, with mean $\mu_{rt}(i_k)$. In this way, non-limiting embodiments or aspects of the present disclosure may not require ground truth in production as required for calculating traditional performance metrics (e.g., precision, accuracy, etc.), may define a novel metric, feature similarity point distribution, which may be obtained based on only real-time and historical feature data, and/or may not require running an offline data pipeline or scoring process.

Figure 4:
FIG. 4 is a diagram of an implementation of non-limiting embodiments or aspects of a process for feature similarity-based monitoring and validation of machine learning models.
Figure 4:
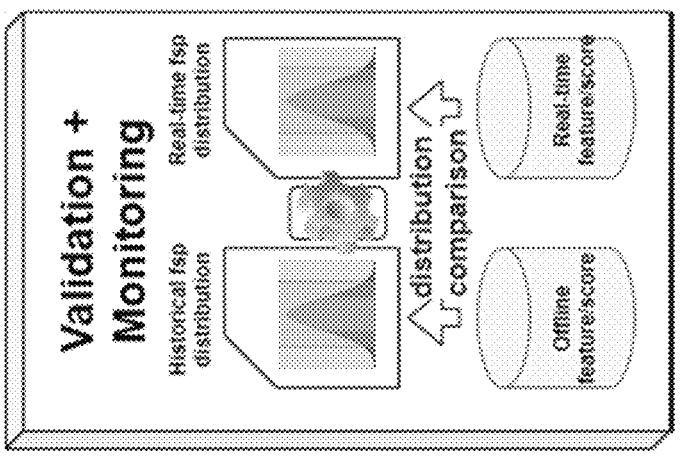
Figure 5:
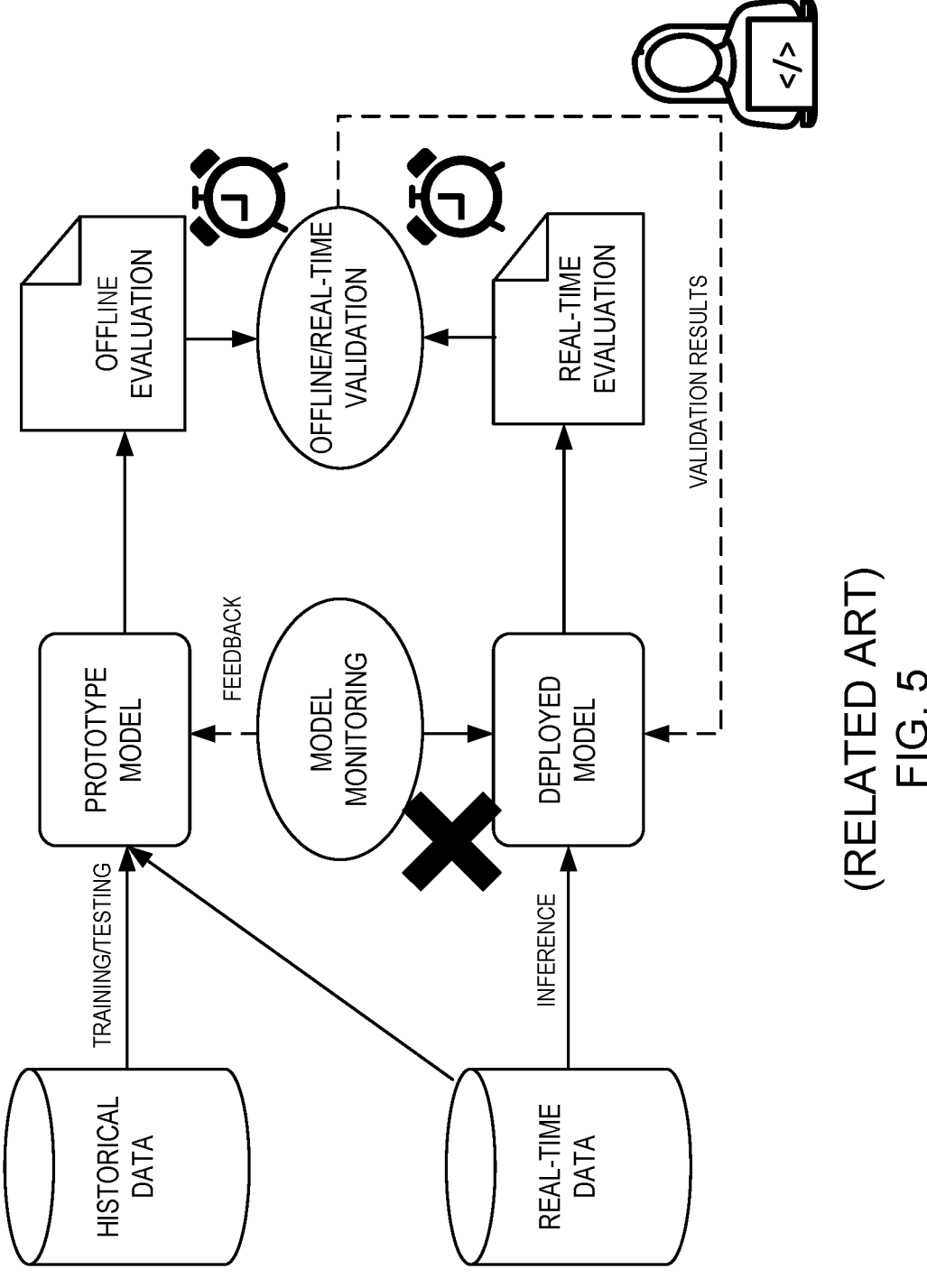
FIG. 5 illustrates example challenges in model monitoring and model validation.

As shown in FIG. 3, at step 316, process 300 includes automatically providing an indication of whether a second machine learning model is aligned with a first machine learning model. For example, transaction service provider system 108 may automatically provide an indication of whether a second machine learning model is aligned with a first machine learning model. As an example, and referring also to FIG. 4, which is a diagram of an implementation 400 of non-limiting embodiments or aspects of a process for feature similarity-based monitoring and validation of machine learning models, transaction service provider system 108 may automatically provide, based on a comparison of the historical feature similarity point distribution $D_{his}(i)$ to the real-time feature similarity point distribution $D_{rt}(i_k)$, an indication of whether the second machine learning model is aligned with the first machine learning model.

In some non-limiting embodiments or aspects, transaction service provider system 108 may perform a hypothesis test to compare the historical feature similarity point distribution $D_{his}(i)$ to the real-time feature similarity point distribution $D_{rt}(i_k)$. For example, transaction service provider system 108 may perform the hypothesis test on $D_{his}(i)$ and $D_{rt}(i_k)$ and identify whether the two means $\mu_{his}(i)$ and $\mu_{rt}(i_k)$ are statistical significantly different. As an example, if the two means $\mu_{his}(i)$ and $\mu_{rt}(i_k)$ are not statistically significantly different (e.g., $\mu_{his}(i)=\mu_{rt}(i_k)$, etc.), an indication that the second machine learning model is aligned with the first machine learning model may be provided (e.g., an indication that production features and scores are aligned with historical features and scores, etc.). As an example, if the two the two means $\mu_{his}(i)$ and $\mu_{rt}(i_k)$ are statistically significantly different (e.g., $\mu_{his}(i) \neq \mu_{rt}(i_k)$ etc.), an indication that the second machine learning model is aligned with the first machine learning model may be provided (e.g., an indication that production features and scores are not aligned with historical features and score, etc.). In this way, non-limiting embodiments or aspects of the present disclosure may combine a monitoring and validation process by performing a hypothesis test on feature similarity point historical and real-time distributions instead of manually comparing each feature and score value.

In some non-limiting embodiments or aspects, in response to determining that the second machine learning model is not aligned with the first machine learning model, transaction service provider system 108 may provide an alert (e.g., to user device 112, etc.).

In some non-limiting embodiments or aspects, in response to determining that the second machine learning model is not aligned with the first machine learning model, transaction service provider system 108 may automatically adjust the first machine learning model (e.g., an offline or prototype model, etc.). For example, transaction service provider system 108 may automatically adjust the first machine learning model as described in U.S. Provisional Patent Application No. 63/306,550, filed on Feb. 4, 2022, the disclosure of which is incorporated by reference herein in its entirety. As an example, this related application describes interpreting authorization decisions generated by a "black box" machine-learning model (e.g., a first machine learning model, etc.), which may be used to generate interpretable decisions in response to queries from a Smarter STIP product or other sources, and reverse engineers the black box model by filtering out historical transactions that are similar to the subject transaction but have an opposite authorization decision in order to identify the parameter(s) causing the particular authorization decision. Non-limiting embodiments or aspects of the present disclosure, in response to determining that the second machine learning model (e.g., a production model, etc.) is not aligned with the first machine learning model (e.g., an offline or prototype model, etc.) may adjust the first machine learning model based on these identified parameters. For example, transaction service provider system 108 may automatically and/or iteratively adjust one or more weights or parameters of the first machine learning model until the historical transactions that are similar to the subject transaction but have an opposite authorization decision due to the identified parameter(s) causing the particular authorization decision, no longer generate the opposite authorization decision. As an example, the interpretable reason(s) may be used to automatically generate one or more modified machine learning models or suggestions for modifying a machine learning model to improve the alignment of the first machine learning model and the second machine learning model.

In some non-limiting embodiments or aspects, a real-time payment transaction includes a first plurality of transaction parameters, the second machine learning model output includes a first authorization decision, and/or transaction service provider system 108 may automatically provide the indication by: in response to the indication including an alert that the second machine learning model is not aligned with the first machine learning model: querying a database including transaction data associated with the plurality of historical payment transactions to identify a subset of historical payment transactions, the transaction data including, for each of the plurality of historical payment transactions, a plurality of transaction parameters and an authorization decision, the subset of historical payment transactions including payment transactions having an authorization decision different from the first authorization decision and having a similarity score that satisfies a threshold; determining at least one impact parameter of the first plurality of transaction parameters by comparing the first plurality of transaction parameters with the plurality of transaction parameters associated with the plurality of historical payment transactions in the subset; and automatically modifying, using a loss function that depends on the at least one impact parameter, the first authorization decision, and/or authorization decisions of the subset of historical transactions, one or more weights or parameters of the first machine learning model. For example, transaction service provider system 108 may automatically and/or iteratively adjust the one or more weights or parameters of the first machine learning model until the historical transactions that are similar to the real-time payment transaction but have an opposite authorization decision, no longer cause the first machine learning model to generate the opposite authorization decision.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:

obtaining, with at least one processor, a plurality of training samples and a plurality of first machine learning model outputs generated by a first machine learning model based on the plurality of training samples;

segmenting, with the at least one processor, based on the plurality of first machine learning model outputs, the plurality of training samples into a plurality of training sample groups;

sampling, with the at least one processor, a number of the training samples from each training sample group of the plurality of training sample groups;

for each training sample group, determining, with the at least one processor, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group;

obtaining, with the at least one processor, an inference sample and a second machine learning model output generated by a second machine learning model based on the inference sample;

classifying, with the at least one processor, based on the second machine learning model output, the inference sample into a training sample group of the plurality of training sample groups;

for each sampled training sample of the training sample group into which the inference sample is classified, determining, with the at least one processor, the feature similarity point for that sampled training sample and the inference sample, wherein a real-time feature similarity point distribution includes the feature similarity point for each sampled training sample and the inference sample; and automatically providing, with the at least one processor, based on a comparison of the historical feature similarity point distribution to the real-time feature similarity point distribution, an indication of whether the second machine learning model is aligned with the first machine learning model, wherein the plurality of training samples is associated with a plurality of historical payment transactions processed in a transaction processing network, wherein the inference sample is associated with a real-time payment transaction currently being processed in the transaction processing network, wherein the real-time payment transaction includes a first plurality of transaction parameters, wherein the second machine learning model output includes a first authorization decision, and wherein the method further includes:

in response to the indication including an alert that the second machine learning model is not aligned with the first machine learning model:

querying, with the at least one processor, a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold;

determining, with the at least one processor, at least one impact parameter of the first plurality of transaction parameters by comparing the first plurality of transaction parameters with the plurality of transaction parameters associated with the plurality of historical payment transactions in the subset; and generating, with the at least one processor, a modified first machine learning model by automatically and iteratively modifying, with the at least one processor, using a loss function that depends on the at least one impact parameter, the first authorization decision, and the authorization decisions of the subset of historical payment transactions, one or more weights or parameters of the first machine learning model until the subset of historical payment transactions no longer cause the first machine learning model to generate the authorization decisions different from the first authorization decision to improve an alignment of the first machine learning model and the second machine learning model.

2. The method of claim 1, wherein the plurality of first machine learning model outputs includes a plurality of raw scores in a predetermined range, and wherein the plurality of training sample groups includes a plurality of evenly spaced intervals in the predetermined range.

3. The method of claim 1, wherein, for each training sample group, the feature similarity point for each pair of sampled training samples in that training sample group is determined according to the following Equation:

$$fsp_{ab} = e^{-\left(\sum_{i=0}^{t1} \frac{\|n_{ia} - n_{ib}\|^2}{2\sigma^2} + \sum_{i=0}^{t2} \delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

4. The method of claim 3, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

5. The method of claim 4, wherein, in response to the hypothesis test determining that the historical feature similarity point distribution is statistically significantly different than the real-time feature similarity point distribution, automatically providing the indication includes automatically providing the indication including the alert that the second machine learning model is not aligned with the first machine learning model.

6. The method of claim 1, wherein each of the first machine learning model and the second machine learning model includes at least one of the following types of machine learning models: a fraud detection model, a Smarter Posting Authorization (SPA) model, or any combination thereof.

7. A system, comprising:

at least one processor programmed and/or configured to:

obtain a plurality of training samples and a plurality of first machine learning model outputs generated by a first machine learning model based on the plurality of training samples;

segment, based on the plurality of first machine learning model outputs, the plurality of training samples into a plurality of training sample groups;

sample, a number of the training samples from each training sample group of the plurality of training sample groups;

for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group;

obtain, an inference sample and a second machine learning model output generated by a second machine learning model based on the inference sample;

classify, based on the second machine learning model output, the inference sample into a training sample group of the plurality of training sample groups;

for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model, wherein the plurality of training samples is associated with a plurality of historical payment transactions processed in a transaction processing network, wherein the inference sample is associated with a real-time payment transaction currently being processed in the transaction processing network, wherein the real-time payment transaction includes a first plurality of transaction parameters, wherein the second machine learning model output includes a first authorization decision, and wherein the at least one processor is further configured to:

in response to the indication including an alert that the second machine learning model is not aligned with the first machine learning model:

query a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold;

determine at least one impact parameter of the first plurality of transaction parameters by comparing the first plurality of transaction parameters with the plurality of transaction parameters associated with the plurality of historical payment transactions in the subset; and generate a modified first machine learning model by automatically and iteratively modifying, with the at least one processor, using a loss function that depends on the at least one impact parameter, the first authorization decision, and the authorization decisions of the subset of historical payment transactions, one or more weights or parameters of the first machine learning model until the subset of historical payment transactions no longer cause the first machine learning model to generate the authorization decisions different from the first authorization decision to improve an alignment of the first machine learning model and the second machine learning model.

8. The system of claim 7, wherein the plurality of first machine learning model outputs includes a plurality of raw scores in a predetermined range, and wherein the plurality of training sample groups includes a plurality of evenly spaced intervals in the predetermined range.

9. The system of claim 7, wherein, for each training sample group, the feature similarity point for each pair of sampled training samples in that training sample group is determined according to the following Equation:

$$fsp_{ab} = e^{-\left(\Sigma_{i=0}^{t1} \frac{\|n_{ia}-n_{ib}\|^2}{2\sigma^2} + \Sigma_{i=0}^{t2}\delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

10. The system of claim 9, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

11. The system of claim 10, wherein, in response to the hypothesis test determining that the historical feature similarity point distribution is statistically significantly different than the real-time feature similarity point distribution, automatically providing the indication includes automatically providing the indication including the alert that the second machine learning model is not aligned with the first machine learning model.

12. The system of claim 7, wherein each of the first machine learning model and the second machine learning model includes at least one of the following types of machine learning models: a fraud detection model, a Smarter Posting Authorization (SPA) model, or any combination thereof.

13. A computer program product comprising at least one non-transitory computer-readable medium including program instructions that, when executed by at least one processor, cause the at least one processor to:

obtain a plurality of training samples and a plurality of first machine learning model outputs generated by a first machine learning model based on the plurality of training samples;

segment, based on the plurality of first machine learning model outputs, the plurality of training samples into a plurality of training sample groups;

sample, a number of the training samples from each training sample group of the plurality of training sample groups;

for each training sample group, determine, a feature similarity point for each pair of sampled training samples in that training sample group, wherein the feature similarity point for a pair of training samples is determined based on features of each sampled training sample in the pair of sampled training samples, and wherein a historical feature similarity point distribution of each training sample group includes the feature similarity point for each pair of sampled training samples in that training sample group;

obtain, an inference sample and a second machine learning model output generated by a second machine learning model based on the inference sample;

classify, based on the second machine learning model output, the inference sample into a training sample group of the plurality of training sample groups;

for each sampled training sample of the training sample group into which the inference sample is classified, determine, the feature similarity point for that sampled training sample and the inference sample, wherein a real-time feature similarity point distribution includes the feature similarity point for each sampled training sample and the inference sample; and automatically provide, based on a comparison of the historical feature similarity point distribution to the real-time feature similarity point distribution, an indication of whether the second machine learning model is aligned with the first machine learning model, wherein the plurality of training samples is associated with a plurality of historical payment transactions processed in a transaction processing network, wherein the inference sample is associated with a real-time payment transaction currently being processed in the transaction processing network, wherein the real-time payment transaction includes a first plurality of transaction parameters, wherein the second machine learning model output includes a first authorization decision, and wherein the program instructions, when executed by the at least one processor, further cause the at least one processor to:

in response to the indication including an alert that the second machine learning model is not aligned with the first machine learning model:

query a database comprising transaction data associated with the plurality of historical payment transactions to identify a subset of historical payment transactions, the transaction data comprising, for each of the plurality of historical payment transactions, a plurality of transaction parameters and an authorization decision, wherein the subset of historical payment transactions comprises payment transactions having an authorization decision different from the first authorization decision and having a similarity score that satisfies a threshold;

determine at least one impact parameter of the first plurality of transaction parameters by comparing the first plurality of transaction parameters with the plurality of transaction parameters associated with the plurality of historical payment transactions in the subset; and generate a modified first machine learning model by automatically and iteratively modifying, with the at least one processor, using a loss function that depends on the at least one impact parameter, the first authorization decision, and the authorization decisions of the subset of historical payment transactions, one or more weights or parameters of the first machine learning model until the subset of historical payment transactions no longer cause the first machine learning model to generate the authorization decisions different from the first authorization decision to improve an alignment of the first machine learning model and the second machine learning model.

14. The computer program product of claim 13, wherein the plurality of first machine learning model outputs includes a plurality of raw scores in a predetermined range, and wherein the plurality of training sample groups includes a plurality of evenly spaced intervals in the predetermined range.

15. The computer program product of claim 13, wherein, for each training sample group, the feature similarity point for each pair of sampled training samples in that training sample group is determined according to the following Equation:

$$fsp_{ab} = e^{-\left(\Sigma_{i=0}^{t1} \frac{\|n_{ia} - n_{ib}\|^2}{2\sigma^2} + \Sigma_{i=0}^{t2} \delta_{iaib}\right)}$$

s.t.

$$\delta_{iaib} = \begin{cases} 0 & \text{if} \quad c_{ia} = c_{ib} \\ 1 & \text{else} \end{cases}$$

where a and b are training samples in the pair of training samples (a, b), $\{x_1, x_2, x_3 \ldots x_T\}$ is a feature set of the plurality of training samples, $\{c_1, c_2, c_3 \ldots c_{t1}\}$ is all categorical features of the feature set $\{x_1, x_2, x_3 \ldots x_T\}$, $\{n_1, n_2, n_3 \ldots n_{t2}\}$ is all numerical features of the feature set $\{x_1, x_2, x_3 \ldots x_T\}$, t1+t2=T, $\{c_{1a}, c_{2a}, c_{3a} \ldots c_{t1a}\}$ is categorical features of the training sample a of the pair of training samples (a, b), $\{c_{1b}, c_{2b}, c_{3b} \ldots c_{t1b}\}$ is categorical features of the training sample b of the pair of training samples (a, b), $\{n_{1a}, n_{2a}, n_{3a} \ldots n_{t2a}\}$ is numerical features of the training sample a of the pair of training samples (a, b), and $\{n_{1b}, n_{2b}, n_{3b} \ldots n_{t2b}\}$ is numerical features of the training sample b of the pair of training samples (a, b).

16. The computer program product of claim 15, wherein the historical feature similarity point distribution is compared to the real-time feature similarity point distribution according to a hypothesis test, and wherein the hypothesis test determines whether the historical feature similarity point distribution is statistically significantly different than the real-time feature similarity point distribution.

17. The computer program product of claim 16, wherein, in response to the hypothesis test determining that the historical feature similarity point distribution is statistically significantly different than the real-time feature similarity point distribution, automatically providing the indication includes automatically providing the indication including the alert that the second machine learning model is not aligned with the first machine learning model.

18. The computer program product of claim 13, wherein each of the first machine learning model and the second machine learning model includes at least one of the following types of machine learning models: a fraud detection model, a Smarter Posting Authorization (SPA) model, or any combination thereof.

* * * * *